US008736685B1

(12) United States Patent
Dorenbosch

(10) Patent No.: US 8,736,685 B1
(45) Date of Patent: May 27, 2014

(54) SYSTEMS AND METHODS FOR MEASURING BRIGHTNESS RESPONSE OF A CAMERA OPERATING IN AUTOMATIC EXPOSURE MODE

(71) Applicant: Anritsu Company, Morgan Hill, CA (US)

(72) Inventor: Jheroen Dorenbosch, Paradise, TX (US)

(73) Assignee: Anritsu Company, Morgan Hill, CA (US)

( * ) Notice: Subject to any disclaimer, the term of this patent is extended or adjusted under 35 U.S.C. 154(b) by 0 days.

(21) Appl. No.: 14/103,613

(22) Filed: Dec. 11, 2013

(51) Int. Cl.
*H04N 17/02* (2006.01)

(52) U.S. Cl.
USPC .......................................... 348/187

(58) Field of Classification Search
CPC ..... H04N 17/002; H04N 17/00; H04N 17/02; H04N 17/004; H04N 17/04; H04N 9/3194; H04N 5/232; H04N 5/217; H04N 5/2254; H04N 17/045; H04N 21/43615; H04N 21/44004; H04N 21/44008; H04N 21/4402
USPC ......... 348/187, 188, 189, 180, 181, 184, 175, 348/177
See application file for complete search history.

(56) References Cited

U.S. PATENT DOCUMENTS

| | | | | |
|---|---|---|---|---|
| 5,113,454 A * | 5/1992 | Marcantonio et al. | ........ | 382/108 |
| 5,155,586 A * | 10/1992 | Levy et al. | .................... | 348/104 |
| 5,181,100 A * | 1/1993 | Hodgson | ........................ | 348/594 |
| 5,185,666 A * | 2/1993 | Capitant et al. | ............... | 348/588 |
| 5,191,645 A * | 3/1993 | Carlucci et al. | ............... | 715/723 |
| 5,526,285 A * | 6/1996 | Campo et al. | ................. | 356/405 |
| 6,577,756 B1 * | 6/2003 | Furui | ............................ | 382/141 |
| 7,110,585 B2 * | 9/2006 | Cork et al. | ..................... | 382/128 |
| 7,394,943 B2 * | 7/2008 | Kinney et al. | ................. | 382/255 |
| 7,649,628 B2 * | 1/2010 | Wadman | ....................... | 356/445 |
| 7,663,664 B2 * | 2/2010 | Rice et al. | ...................... | 348/187 |
| 7,751,653 B2 * | 7/2010 | Bodnar et al. | ................ | 382/315 |
| 7,916,173 B2 * | 3/2011 | Clark et al. | ..................... | 348/180 |
| 8,345,104 B2 * | 1/2013 | Liu et al. | ........................ | 348/187 |
| 8,626,268 B2 * | 1/2014 | Adler et al. | .................... | 600/424 |
| 2006/0001955 A1 * | 1/2006 | Kinney et al. | ................. | 359/391 |
| 2007/0013780 A1 * | 1/2007 | Rice et al. | ...................... | 348/187 |
| 2008/0285879 A1 * | 11/2008 | Kinney et al. | ................. | 382/255 |
| 2008/0309929 A1 * | 12/2008 | Christiansen et al. | ..... | 356/243.1 |
| 2010/0134634 A1 * | 6/2010 | Witt | .............................. | 348/181 |
| 2012/0133930 A1 * | 5/2012 | Christiansen et al. | ..... | 356/243.1 |
| 2012/0328178 A1 * | 12/2012 | Remiszewski et al. | ........ | 382/133 |
| 2013/0057707 A1 * | 3/2013 | Hasegawa et al. | ............ | 348/189 |

* cited by examiner

*Primary Examiner* — Paulos M Natnael
(74) *Attorney, Agent, or Firm* — Meyer IP Law Group

(57) ABSTRACT

A method to measure a brightness response of a camera comprises obtaining a plurality of brightness measurements and determining for one or more of the plurality of brightness measurements a captured brightness of the captured image. Obtaining each of the plurality of brightness measurements includes presenting to the camera at least one test sample having known brightness, capturing via the camera an image of the at least one test sample, and presenting to the camera at least one compensation sample having compensating brightness selected based on the known brightness of the at least one test sample. The at least one test sample and the at least one compensation sample are selectable and presentable in combination such that an average exposure interpreted by the camera is substantially the same for each of the plurality of brightness measurements.

22 Claims, 7 Drawing Sheets

SYSTEMS AND METHODS FOR MEASURING BRIGHTNESS RESPONSE OF A CAMERA OPERATING IN AUTOMATIC EXPOSURE MODE

TECHNICAL FIELD

The present invention relates to measuring camera response to changes in lighting conditions.

BACKGROUND

Telecommunication network operators are regularly tasked with evaluating performance of user equipment (UE) devices, particularly UE devices newly introduced for use in telecommunication applications operating over the operators' networks. Typically, UE devices are assembled by manufacturing partners of the operators and delivered for evaluation. Different specifications must be met for different subcomponents of UE devices. For example, displays and cameras for UE devices such as cell phones and tablets must function across a broad range of lighting conditions. For cameras, various tests are required, including measurement of camera response to different levels of brightness in lighting conditions.

Most cameras for UE devices include an automatic exposure control feature. Automatic exposure control is convenient for the end user, because it allows use of the camera in lighting conditions ranging from the high intensity of broad daylight to the low intensity of dimly lit rooms. Automatic exposure control adjusts gain, exposure time, and/or aperture based on the lighting conditions so that ideally the overall picture has the objectively correct brightness. Adjustment takes a certain response time, typically on the order of a fraction of a second. The region in the image that is used to set the exposure varies from the full image, a matrix of dots, a small spot at a fixed location or a dynamically determined area (for example where a face has been detected).

Unfortunately, automatic exposure control hinders the measurement of the response curves generated when testing cameras for inclusion in UE devices. This is because, when the camera captures a test image of uniform brightness, the automatic exposure control of the camera will adjust the exposure to make the image appear grayish. What is needed are improved methods and systems for measuring brightness response of a camera operating in automatic exposure mode.

SUMMARY

In accordance with an embodiment, a method of measuring a brightness response of a camera comprises obtaining a plurality of brightness measurements for test samples having a known brightness. Obtaining a brightness measurement can include presenting to the camera at least one test sample having known brightness, capturing via the camera an image of the at least one test sample, and presenting to the camera at least one compensation sample having compensating brightness selected based on the known brightness of the at least one test sample. The at least one test sample and the at least one compensation sample are selectable and presentable in combination such that an average exposure interpreted by the camera is substantially the same for each of the plurality of brightness measurements.

In an embodiment, the at least one test sample is presented to the camera on a display. The display can comprise, for example, an active display such as a liquid crystal display or it can comprise a passive display, such as a screen on which a sample is projected by a projector with precisely controlled brightness.

In an embodiment, a method can further comprise generating a response curve for the camera based on the known brightness of the at least one test sample and the captured brightness of the captured image for at least one test sample for two or more of the brightness measurements.

In an embodiment, presenting at least one test sample having known brightness includes presenting the at least one test sample having one of a plurality of different known brightnesses of grayscale and/or one of a plurality of different known brightnesses of color. In embodiments, the at least one test sample and the at least one compensation sample are presented consecutively or alternatively are presented simultaneously.

In an embodiment, the selected compensating brightness is determined for at least one of the plurality of brightness measurements by presenting a reference sample to the camera and alternately presenting the at least one test sample and at least one candidate compensation sample. The at least one candidate compensation sample is a sample having candidate brightness. The response of the exposure interpreted by the camera is observed. If the response of the average exposure interpreted by the camera satisfies a predetermined threshold of stability, the at least one candidate compensation sample is assigned to the at least one test sample as a compensation sample. Otherwise, subsequent candidate compensation samples having different candidate brightnesses are substituted for the at least one candidate compensation sample and the steps are repeated until the average exposure interpreted by the camera satisfies the predetermined threshold of stability.

Where the camera applies automatic exposure adjustment in response to the average exposure, determining the selected compensating brightness can include verifying that a measured brightness satisfies a predetermined threshold of stability during the automatic exposure adjustment. In an embodiment, a response time of the automatic exposure adjustment is determined and verifying that the measured brightness satisfies a predetermined threshold of stability includes verifying that the measured brightness does not exceed the predetermined threshold of stability for a duration related to the determined response time.

In an embodiment, a system to measure a brightness response of a camera comprises a display and one or more processors usable for obtaining a plurality of brightness measurements. For each brightness measurement, the one or more processors are configured to cause the system to present to the camera, via the display, at least one test sample having known brightness and at least one compensation sample having compensating brightness selected based on the known brightness of the at least one test sample and capture, via the camera, an image of the at least one test sample. The one or more processors are further configured to determine a captured brightness for one or more of the captured images. The at least one test sample and the at least one compensation sample are selectable and presentable in combination such that an average exposure interpreted by the camera is substantially the same for each of the plurality of brightness measurements.

BRIEF DESCRIPTION OF THE DRAWINGS

Further details of the present invention are explained with the help of the attached drawings in which.

DETAILED DESCRIPTION

Figure 1:
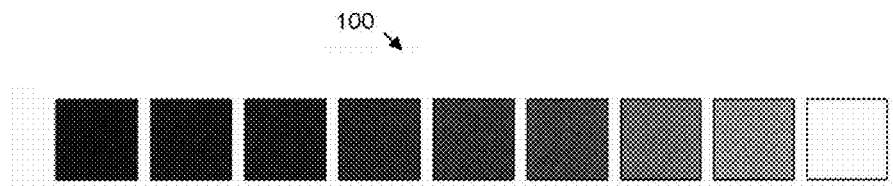
FIG. 1 shows an exemplary set of test samples usable for measuring a brightness response curve of a camera.

The following description is of the best modes presently contemplated for practicing various embodiments of the present invention. The description is not to be taken in a limiting sense but is made merely for the purpose of describing the general principles of the invention. The scope of the invention should be ascertained with reference to the claims. In the description of the invention that follows, like numerals or reference designators will be used to refer to like parts or elements throughout. In addition, the first digit of a reference number introduced in FIGS. 1-9 and the first two digits of a reference number introduced in FIGS. 10-13 identify the drawing in which the reference number first appears.

It would be apparent to one of skill in the art that the present invention, as described below, may be implemented in many different embodiments of hardware, software, firmware, and/or the entities illustrated in the figures. Further, the frame rates and brightness range and increments used in the figures and description are merely exemplary. Any actual software, firmware and/or hardware described herein, as well as any frame rates and brightness specifications generated thereby, is not limiting of the present invention. Thus, the operation and behavior of the present invention will be described with the understanding that modifications and variations of the embodiments are possible, given the level of detail presented herein.

A useful camera test, referred to herein as a brightness response test, includes measurements of camera response to various levels of sample brightness to determine the linearity of the camera response. Ideally, a response curve generated by the brightness response test is linear, but response curves in reality often have some degree of non-linearity, for example responses are often multi-slope or non-linear according to a specific function. A non-linear response curve can result, for example, from incorrect gamma correction, saturation, or lack of response at low light levels. A brightness response test can be performed with grayscale samples ranging in brightness from pure black to pure white, or with colored samples similarly ranging in brightness. FIG. 1 shows a set 100 of samples that may be used to measure camera response to changes in brightness. Each of the nine samples in the set of samples has a known brightness. Each sample can be displayed to and captured by a camera under test as an image. The brightness level of the camera response is then measured, for example by averaging the pixel values in a predetermined area or areas of the image. The brightness level measurements can then be plotted as a function of known image brightness level to obtain a response curve. Optionally, each sample can be displayed to and captured as an image by the camera multiple times and/or for a minimum duration to improve measurement precision.

Figure 2:
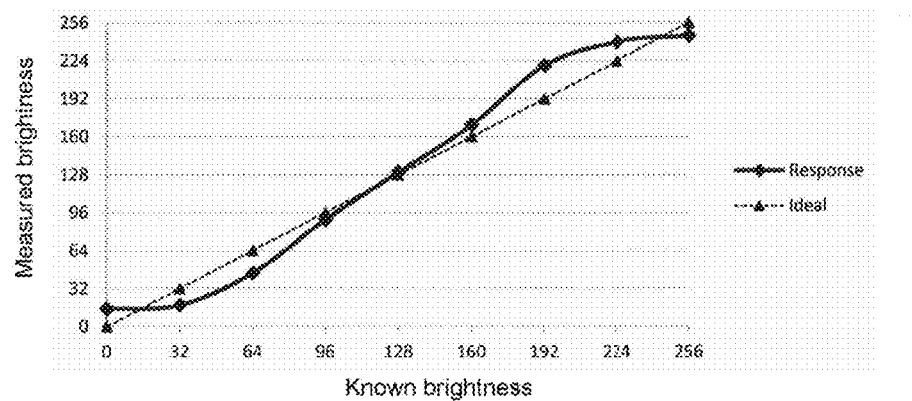
FIG. 2. is an exemplary plot of an ideal camera response and a typical camera response to grayscale samples of varying brightness.
Figure 3:
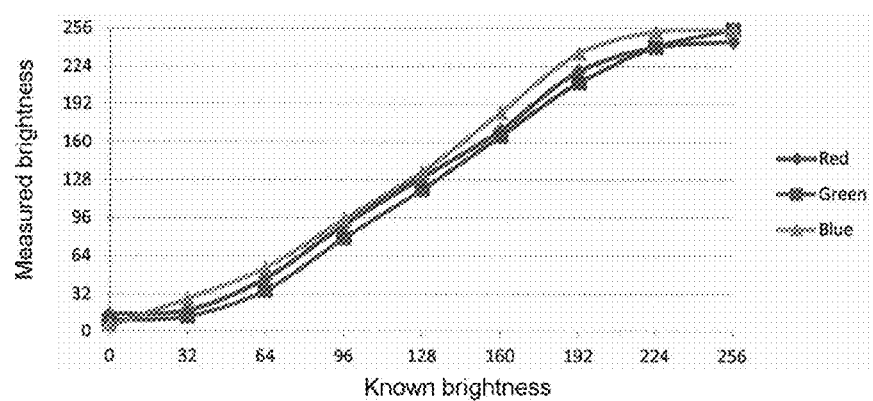
FIG. 3. is an exemplary plot of an ideal camera response and a typical camera response to samples of varying brightness of various colors.

Referring to FIG. 2, an ideal response curve is shown plotted as a dashed straight line. As shown, the response curve is measured at multiple brightness levels for an 8-bit image measurement capability, which allows for 256 different intensities (i.e., brightness levels) to be recorded. One of ordinary skill in the art will appreciate that embodiments of systems and methods in accordance with the present invention can also be applied for obtaining response curves for images of different bit count and having a different number of brightness levels. A typical response curve for a low quality video camera, such as a webcam, is also shown plotted as a solid line. The camera has a non-zero response to a pure black sample and saturates at a value that is lower than the maximum brightness value (i.e. before a pure white sample is measured). Referring to FIG. 3, response curves can also be generated for camera response to different levels of brightness for different colors. The colors can be chosen in a convenient color space. For example, if the camera sensor measures color in the red-green-blue (RGB) color space, sets of samples of varying intensity in pure red, blue, and green can be used. Typically cameras have different responses to different colors, and a careful measurement of response curves for the primary colors is beneficial for understanding camera performance.

Figure 4:
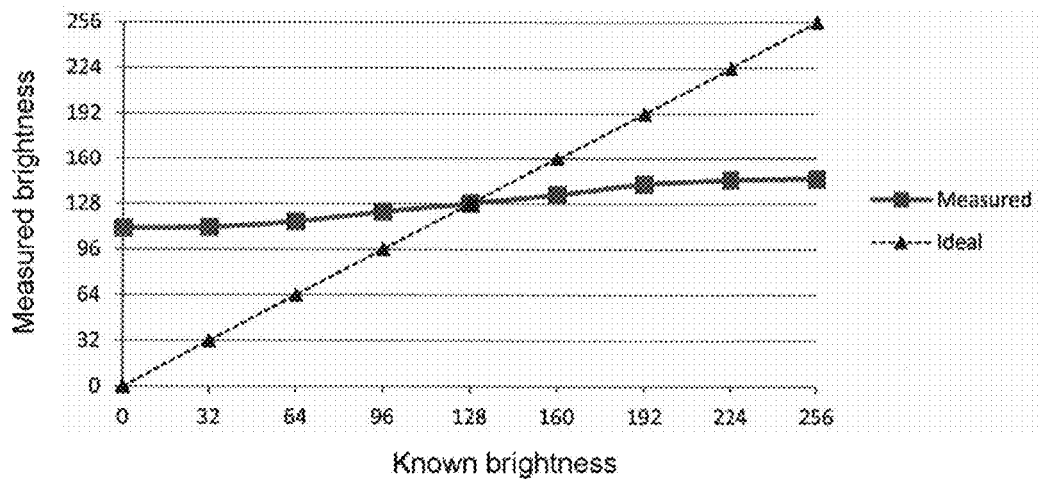
FIG. 4 is an exemplary plot of a typical camera response to samples of varying brightness with automatic exposure control enabled.

Problematically, many UE devices use cameras that include an automatic exposure (AE) control feature. As mentioned above, AE control is convenient for the end user, because it allows use of the camera in a broad range of lighting conditions, adjusting gain, exposure time, and/or aperture based on those lighting conditions so that the overall picture has the objectively "correct" brightness. Unfortunately, the AE control feature hinders measurement of camera response to sample brightness during testing. As the camera captures a test image of uniform brightness, the camera is automatically adjusting the exposure to make the image appear "correct," with the end result being that the image appears gray (or mid-range, where the image is of a color). Referring to FIG. 4, an ideal response curve is shown plotted as a dashed straight line. A typical response curve for a camera including AE control is also shown plotted as a solid line. A response curve for the camera is approximately flat, with the measured brightness falling within a narrow band of brightness across the entire set of samples displayed to the camera.

Figure 5:
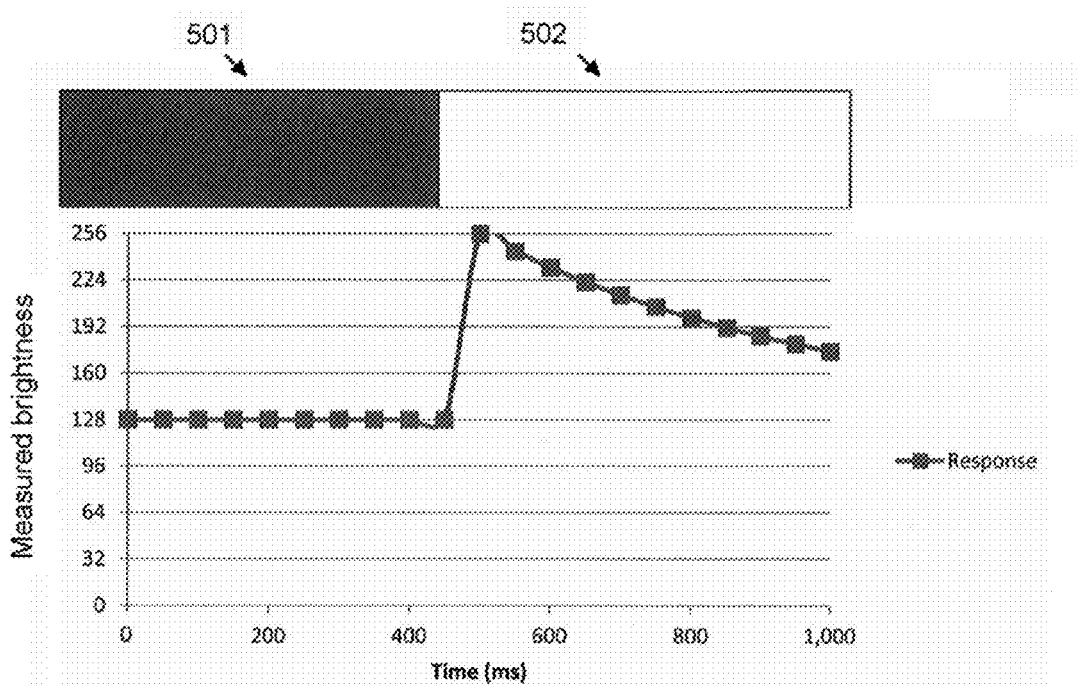
FIG. 5 is an exemplary plot of a typical camera response to a sudden increase in brightness with automatic exposure control enabled.

Embodiments of system and methods in accordance with the present invention display to a camera a series of calibrated or known test samples so that, within a response time of the AE control feature of the camera, an AE algorithm of the camera sees an image of constant average brightness. Referring to FIG. 5, an AE algorithm of a camera has a response time measurable by displaying to the camera a dark or gray reference sample 501 long enough to let the AE algorithm stabilize and then displaying to the camera a white test sample 502 while continuously measuring the response of the camera. As can be seen in FIG. 5, the AE control of the camera will measure the white sample 502 as a very bright image that will diminish in brightness as the AE algorithm adjusts the exposure. The algorithm response time can be determined by analyzing the response as a function of time.

In an embodiment, a test system and method in accordance with the present invention can use temporal changes in brightness to accurately measure camera response to brightness levels in a camera that has an AE control feature. A test system can present a set of test samples interspersed in time with secondary samples. The secondary samples are compensation samples that have a brightness level preselected so that when a test sample and a succeeding compensation sample are combined in time by the AE algorithm, a constant average exposure is produced. Each sample is presented to the camera for a duration that is significantly shorter than the response time of the AE algorithm. The AE algorithm perceives the sequence test samples as a constant gray level. The AE control feature of the camera will maintain a constant exposure level, and camera adjustments during measurements can be avoided.

Figure 6:
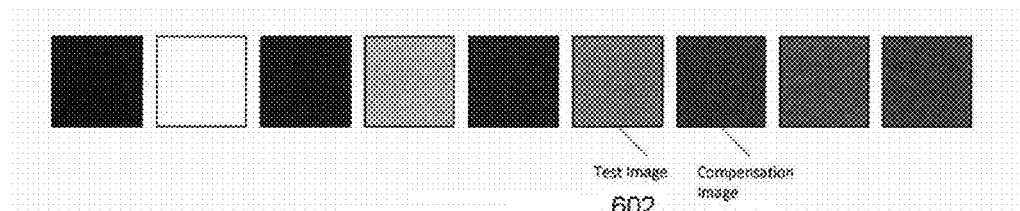
FIG. 6 shows an embodiment of a set of test and compensation samples in accordance with the present invention usable for measuring a brightness response curve of a camera having automatic exposure control.

FIG. 6 shows a sequence of test samples 602 each followed by an associated compensation sample 652. The timing of the camera is controlled such that the camera only captures and measures images of the test samples for determining brightness response. Alternatively the camera can capture images of all of the samples and only measure images of the test samples. The latter method can be useful, for example, for a video camera where the frame rate of the entire sequence of images is continuous and rapid. Measurement accuracy of a test sample can be increased by repeating the combination of a particular test sample and a corresponding compensation sample multiple times and averaging the measurements of the same image captured of the test image.

Figure 7:
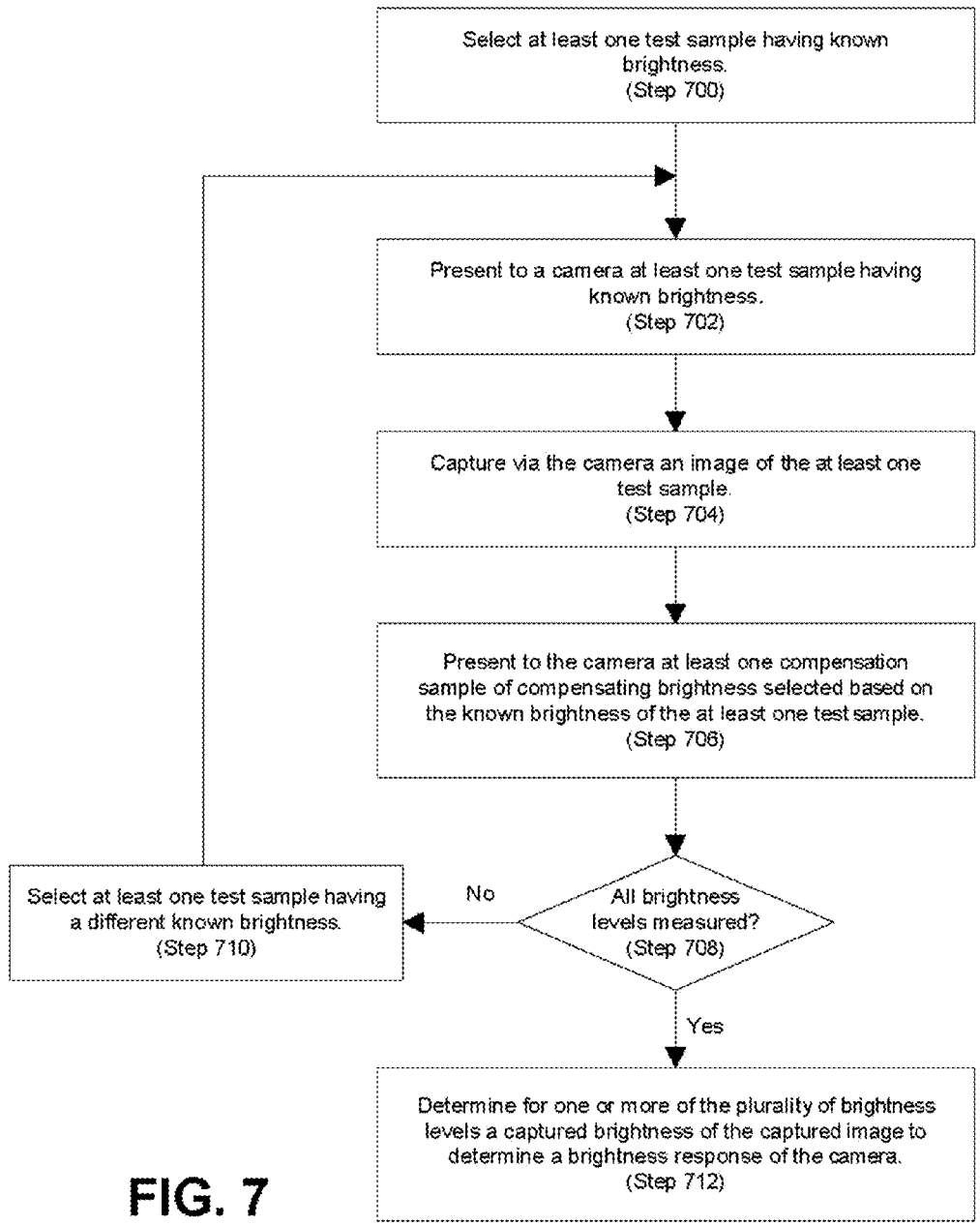
FIG. 7 is a flowchart for an embodiment of a method for measure a brightness response of a camera in accordance with the present invention.

FIG. 7 is a flowchart of an embodiment of a method in accordance with the present invention for measuring camera response to brightness level for a camera with an AE control feature. The method includes selecting at least one test sample having a known brightness (Step 700), presenting to a camera with an AE control feature the at least one test sample (Step 702), capturing, via the camera, an image of the at least one test sample (Step 704), and presenting to the camera at least one compensation sample of a compensating brightness selected based on the known brightness of the at least one test sample (Step 706). The method further includes repeating the steps of presenting a test sample, capturing an image of the test sample, and presenting a compensation sample for a plurality of test samples having different brightnesses with different corresponding compensation samples (Step 708 and 710). It is noted that alternatively, the compensation sample can be shown before the test sample. Once images of all of the test samples are captured, a brightness response of the camera can be determined by determining a captured brightness for each of the images (Step 712). In an alternative embodiment of the method, the camera can capture images of both the test sample and the compensation sample and only determine brightness response of the camera based on the images of the test samples.

The inventor has observed that the response of the AE algorithm can be non-linear, such that selecting a brightness of a compensation sample is not necessarily a simple calculation. For example, a test sample with a brightness of 25% may not be balanced by a corresponding compensation sample with a brightness of 75%. An embodiment of a method in accordance with the present invention can be used to determine a brightness level for a compensation sample to correctly balance a corresponding test sample so that the AE algorithm interprets a brightness level within a predefined range of deviation from a brightness level targeted to prevent adjustment of camera settings. The method uses a reference sample of a set brightness level. If measuring a black and white brightness response curve, the reference sample should be gray. If measuring a color brightness response curve, the reference sample should be a mid-tone of the color. The camera captures the reference sample for a duration of several response times of the AE algorithm, so that the camera response settles. An alternating sequence of the test sample and the compensation sample is then displayed to the camera.

Figure 8:
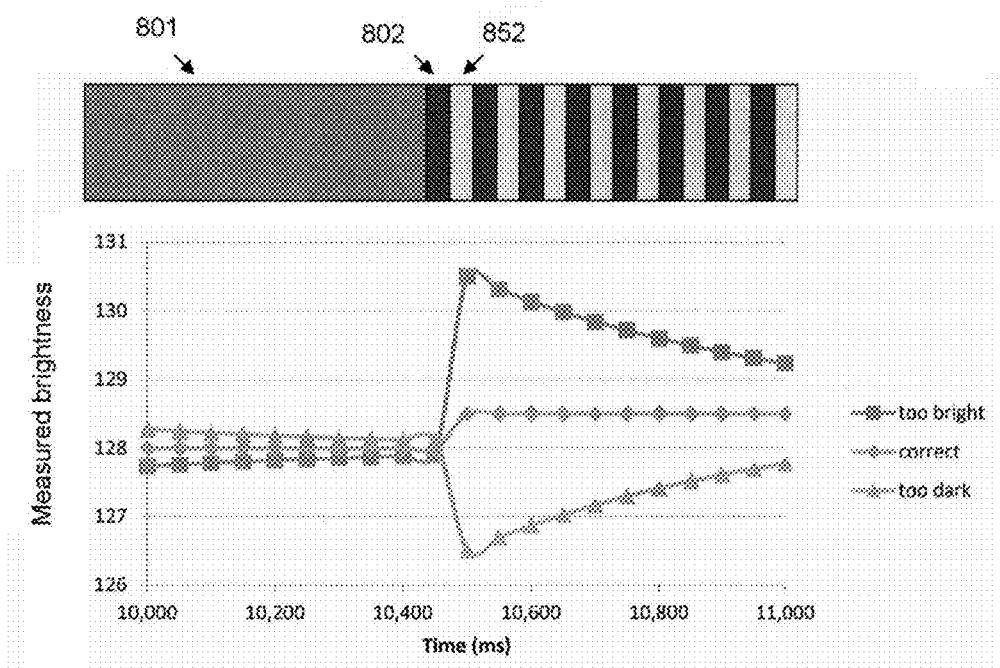
FIG. 8 shows an embodiment of a method to verify the correct brightness of a compensation sample.

FIG. 8 shows a plot of response curves as samples above the plot are displayed to the camera, following along from left to right. The plot displays an expanded vertical scale. The left side of the plot shows how the measurements of a gray reference sample 801 settle after a few response-time durations. Ideally, when a correct sequence of alternating test samples 802 and compensation samples 852 starts, the average brightness of the images as measured by the camera will be constant. The AE algorithm will perceive a constant exposure and will not make exposure adjustments. Thus, for a correct balance between test sample and compensation sample brightness, the average captured brightness will remain constant (see "correct" line with diamond plot points). If the response of the AE algorithm is non-linear, there may be a slight offset in the average brightness level captured by the camera.

However, there may be a jump in the average brightness level captured by the camera if the compensation sample 852 is too bright in relation to the test sample 802. In that case, the AE algorithm will gradually lower the exposure and the average measured brightness of the images will decrease over the duration of a few response-time durations (see "too bright" line with square plot points). Conversely, if the compensation sample 852 is too dark in relation to the test sample 802, the average measured brightness of the images will increase over time (see "too dark" line with triangle plot points). If a test system observes a gradual brightness decrease, the brightness of the compensation sample 852 should be decreased, and conversely if the test system observes a gradual brightness increase, the brightness of the compensation image 852 should be increased. Those skilled in the art will recognize that similar results can be reached by reversing the order of the reference image and the alternating images. Ideally one would choose the brightness of the color/gray reference sample 801 such that the AE algorithm responds to it in the same fashion as to a rapidly alternating sequence of pure white and pure color/black samples.

Figure 9:
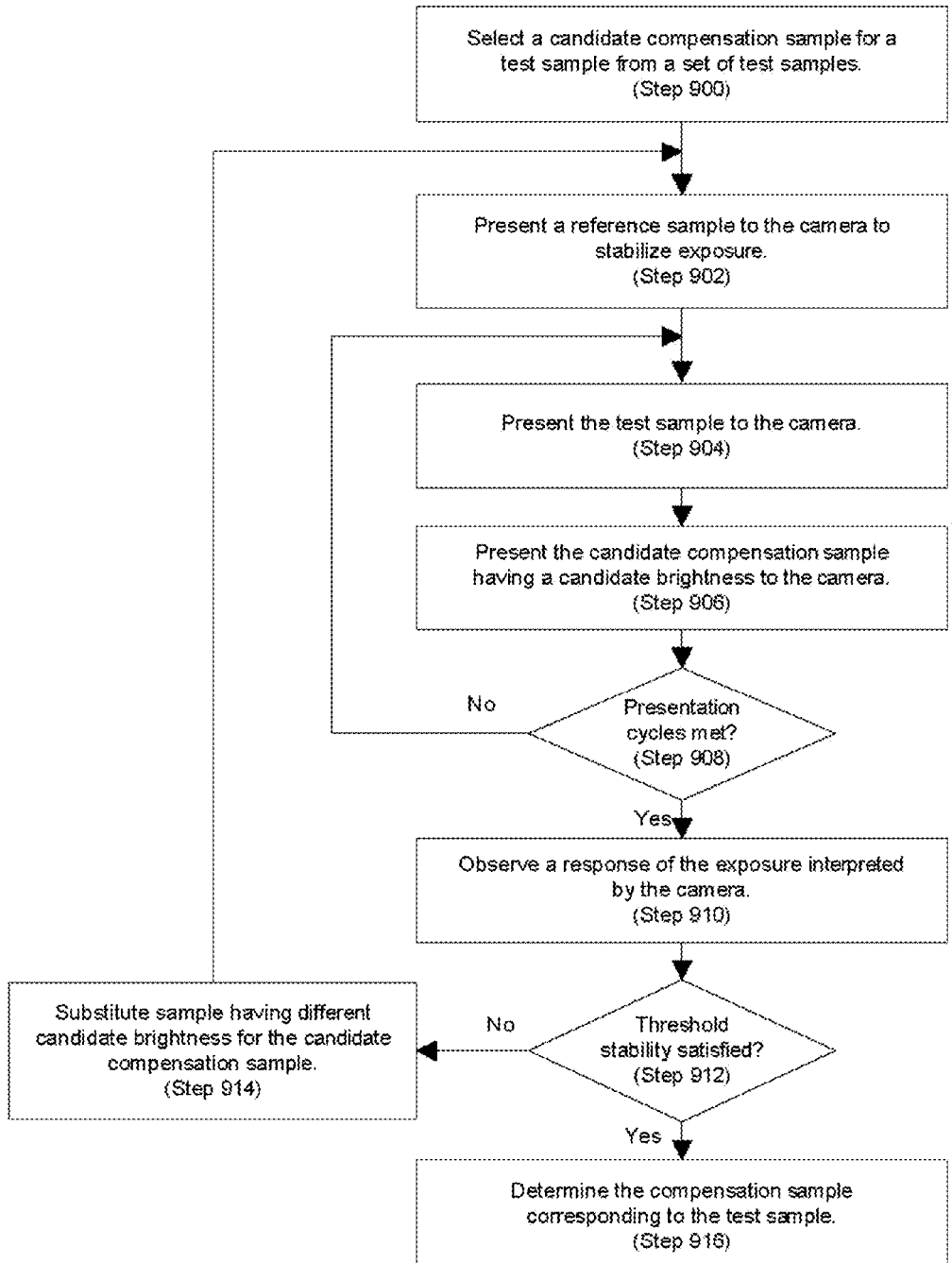
FIG. 9 is a flowchart for an embodiment of a method for selecting compensating samples for use in methods for measuring a brightness response of a camera in accordance with the present invention.

FIG. 9 is a flowchart of an embodiment of a method in accordance with the present invention for determining brightness level for a compensation sample corresponding to a test sample for use in measuring camera response to brightness level in accordance with the present invention. The method comprises selecting a candidate compensation sample having a known brightness (Step 900) to compensate for a test sample from a set of test samples and measuring camera response to an alternating presentation of the test sample and the candidate compensation sample. The test sample and candidate compensation sample can be grayscale or color samples. The method comprises first showing a reference sample to the camera and allowing the AE algorithm of the camera to stabilize (Step 902). The test sample and compensation sample are then alternately and repeatedly displayed to the camera, in either starting order, for a number of presentation cycles to observe a response of the AE algorithm (Steps 904, 906, and 910). The number of presentation cycles can be predetermined (Step 908). Observation of the response of the AE algorithm (Step 910) can be done during the presentation cycles or afterwards, based on stored measurements.

If the response of the AE algorithm satisfies a predetermined threshold of stability (Step 912), then the candidate compensation sample is determined to be a suitable compensation sample for the test sample (Step 916). If the response of the AE algorithm does not satisfy the predetermined threshold of stability (Step 912), then a new candidate compensation sample having a different brightness is selected (914) and the steps of stabilizing, and alternately displaying the test and candidate samples to the camera are repeated.

As described above, if the response is observed to spike and then slowly drop, the brightness of the new candidate compensation sample can be decreased relative to the initial candidate compensation sample. If the response is observed to drop and then slowly rise, the brightness of the new candidate compensation sample can be increased relative to the initial candidate compensation sample. The process of selecting candidate compensation samples can be repeated until the response of the AE algorithm satisfies the predetermined threshold of stability.

Figure 10:
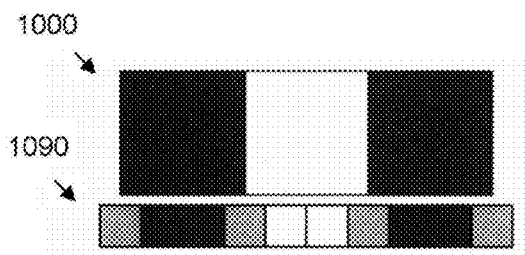
FIG. 10 shows exemplary sequences of samples aligned with capture rates of a camera under test.

In some embodiments, the duration of time that a sample is presented to the camera need not necessarily be the same between the compensation sample and the test sample. However, the duration of time that the test sample and the compensation sample are presented to the camera should be shorter than the response time of the AE algorithm. Further, the capture time of images with the camera should be shorter than the duration time of a sample. FIG. 10 illustrates an example sequence of test-calibration-test samples 1000 above a series of image captures 1090 by the camera. The capture rate (or frame rate) of the camera is several times higher than the frame rate of the samples. Embodiments of methods in accordance with the present invention are effective for cameras having capture rates that are shorter than a response time of the AE algorithm. In many cases, embodiments of test systems for applying methods in accordance with the present invention do not have control of the capture rate of a camera under test, for example where the UE device is a smart phone.

Figure 11:
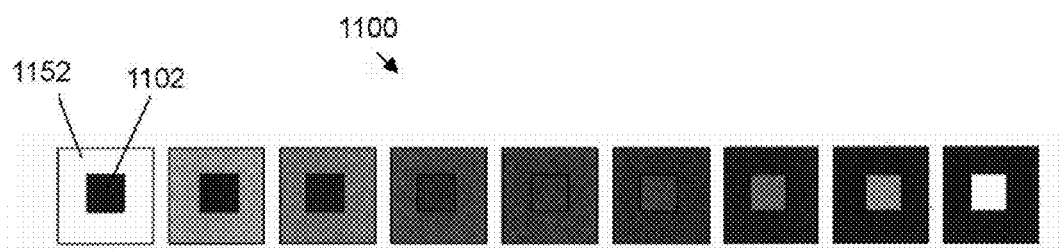
FIGS. 11 and 12 show alternative embodiments of a set of test and compensation samples in accordance with the present invention usable for measuring a brightness response curve of a camera having automatic control.
Figure 12:
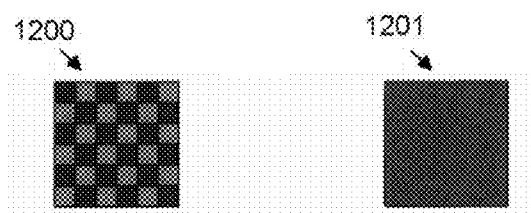

In an alternative embodiment of a method in accordance with the present invention for measuring camera response to brightness level for a camera with an AE control feature, a response of the AE algorithm can be balanced by presenting a single sample that has a test area and a compensation area. The single sample can be constructed in myriad different ways, limited by an ability of the AE algorithm to observe portions of each area and an ability of a measurement algorithm applied to a captured image from the sample to distinguish the test area for determining the response to brightness level. FIG. 11 shows an example sequence of samples 1100, where a test area 1102 of each sample is provided in the center of the sample and the compensation area 1152 is provided at the edge of the sample. For each sample in the sequence of samples, the method preferably uses a similar set of pixels in the captured test area to compute measured brightness. For AE algorithms that use a small measuring spot, AE algorithm may only see the brightness of the test area. The example sequence of samples shown in FIG. 11 will not work well with such AE algorithms because the AE algorithms cannot gather information from the compensation area. However, samples having many different configurations of test areas and compensation areas can be used with embodiments of methods in accordance with the present invention. For example, test and compensation areas having different geometries, including for example, circles, ovals, stripes, etc., can be used. One of ordinary skill in the art will appreciate, upon reflecting on the teachings herein, the myriad different ways that a test area and compensation area can be arranged with respect to each other in a single sample. Referring to FIG. 12, a sample 1200 comprising a checkerboard pattern is shown, along with a reference sample 1201, useable with embodiments of the present invention. The sample is relatively easy to handle in software because the checkerboard pattern is easily recognized. Thus such a pattern can work well for AE algorithms having a wide range of metering schemes.

For each sample, the brightness of the compensation area(s) is balanced with the brightness of the test area(s). The brightness of the compensation area(s) in the sample is adjusted such that the AE algorithm responds the same to both the sample and a reference sample. The reference sample can have a homogenous brightness across the reference sample, or, for example, the reference sample may be one of the samples in the sequence. In embodiments of methods similar to those described above in regards to FIG. 9, to determine whether the brightness of a sample is correct, samples from a set of sample are alternated with the reference sample to observe the stability of the overall measured brightness for each sample. Ideally, the measured brightness is constant, although the response of the AE algorithm preferably falls within a predetermined threshold of stability.

In an embodiment, a system for measuring a brightness response of a camera in accordance with the present invention comprises a display and one or more processors usable for obtaining a plurality of brightness measurements. For each brightness measurement, the one or more processors are configured to cause the system to present to the camera, via the display, at least one test sample having known brightness and at least one compensation sample having compensating brightness selected based on the known brightness of the at least one test sample and capture, via the camera, an image of the at least one test sample. The one or more processors are further configured to determine a captured brightness for one or more of the captured images. The at least one test sample and the at least one compensation sample are selectable and presentable in combination such that an average exposure interpreted by the camera is substantially the same for each of the plurality of brightness measurements. The display can be any medium suitable for presenting a sample of known brightness to a camera for capture. For example, a screen can be a liquid crystal display (LCD), a projection screen, a front-lit series of flashcards mechanically presented to the camera, etc. The display need only be capable of accurately representing known brightness of the sample presented to the camera. In preferred embodiments, the system includes an ability to synchronize the camera under test with the display so that the camera captures images at least when test samples are presented.

Typically, a test system can measure camera properties in addition to response to brightness levels. For example, a test system can measure depth of field and image stabilization. Preferably, such measurements are made in an automated fashion and in an environment where the UE can be controlled remotely, for example via a radio frequency (RF) interface of the UE or via a universal serial bus (USB) interface of the UE.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Figure 13:
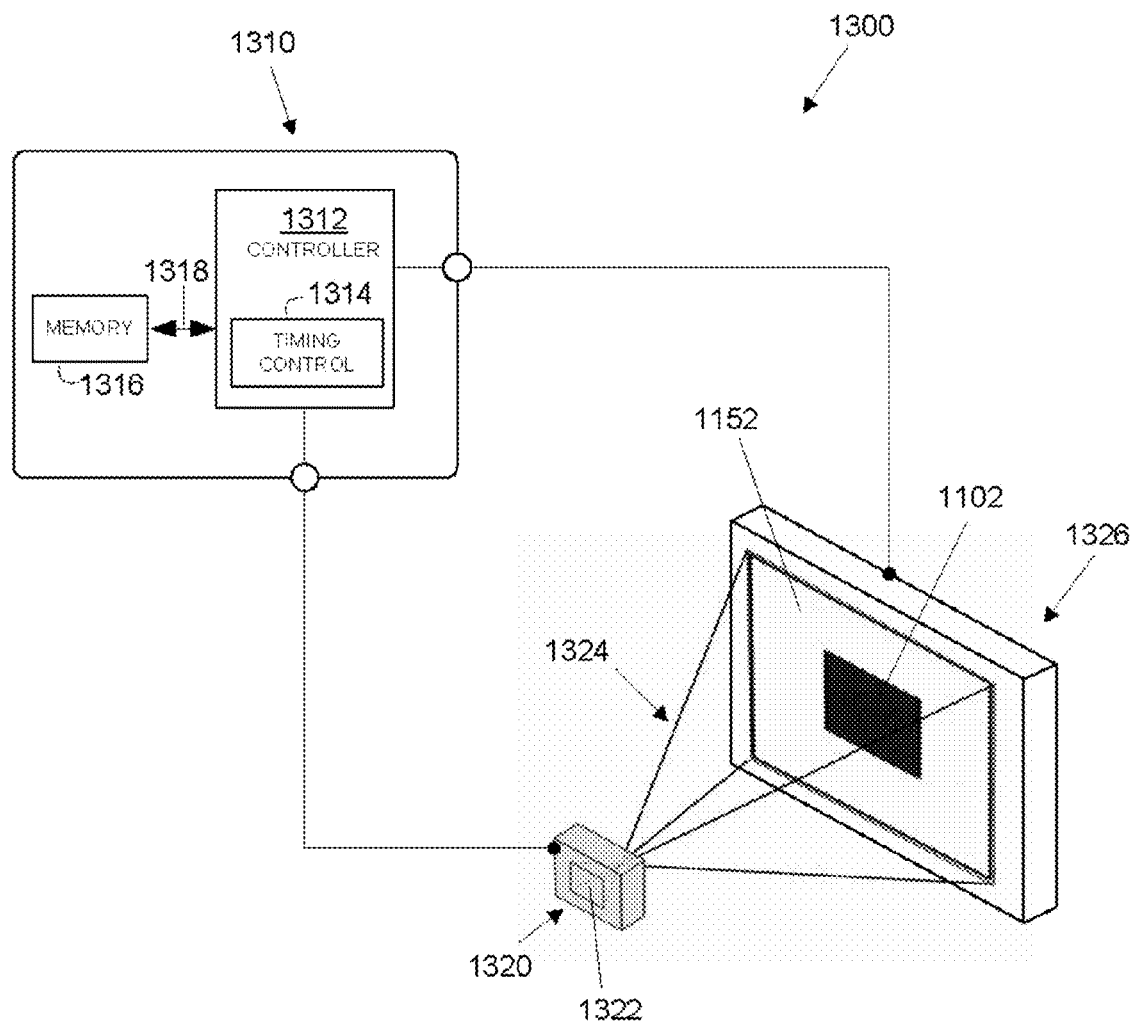
FIG. 13 illustrates an embodiment of a system for capturing images of samples of known brightness in accordance with the present invention.

FIG. 13 is a simplified block diagram of an embodiment of a system 1300 for measuring a brightness response of a camera in accordance with the present invention. While a particular brightness measurement system is shown, this is for purposes of illustration only, and one of ordinary skill in the art could readily add, duplicate, eliminate or disable the circuitry in any desired combination.

A brightness measurement device 1310 includes a programmable microcontroller 1312 that controls what samples 1102, 1152 are presented to a camera 1320. As shown, samples 1102, 1152 are presented via a display 1326 controlled by the brightness measurement device 1310 and arranged, along with the camera 1320, so that a field of view 1324 of the camera 1320 is matched to the display 1326. The programmable microcontroller 1312 also controls, via timing control circuitry 1314, when samples are shown and images are captured by the camera 1320 so that the steps of presenting samples and capturing images are synchronized. The image is captured via a sensor 1322 of the camera 1320.

As is well known in the art, the microcontroller 1312 typically includes a microprocessor, or equivalent control circuitry, designed specifically for controlling the display 1326 and the presentation of samples on the display 1326, and for controlling the capturing of images by the camera 1320. The brightness measurement device 1310 can also include input/output (I/O) circuitry and memory, for example RAM or ROM memory 1316, or other non-transitory machine readable medium having instructions thereon. Optionally, the microcontroller 1312 can includes circuitry enabling the processing of captured images (data) to generate brightness response curves as controlled by a program code stored in a designated block of memory. The details of the design of the microcontroller 1312 are not critical to the present invention. Rather, any suitable microcontroller 1312 can be used to carry out the functions described herein. The use of microprocessor-based control circuits for data analysis functions are well known in the art.

The microcontroller 1312 is further coupled to the memory 1316 by a suitable data/address bus 1318, wherein the programmable operating parameters used by the microcontroller 1312 are stored and modified, as required, in order to customize the operation of the brightness response device 1310. Such operating parameters define, for example, the areas of a captured image of a sample which are used for determining brightness of the captured image and the proper calibration samples to be display along with or in sequence with a test sample of known brightness.

The above described brightness measurement device 1310 and display 1326 are described as exemplary devices. One or ordinary skill in the art would understand that embodiments of the present invention can be used with alternative types of brightness measurement devices and displays. Accordingly, embodiments of the present invention should not be limited to use only with the above described devices.

The previous description of the preferred embodiments is provided to enable any person skilled in the art to make or use the embodiments of the present invention. While the invention has been particularly shown and described with reference to preferred embodiments thereof, it will be understood by those skilled in the art that various changes in form and details may be made therein without departing from the spirit and scope of the invention.

The invention claimed is:

1. A method to measure a brightness response of a camera, comprising:
    obtaining a plurality of brightness measurements, wherein obtaining each of the plurality of brightness measurements includes
        presenting to the camera at least one test sample having known brightness,
        capturing via the camera an image of the at least one test sample, and
        presenting to the camera at least one compensation sample having compensating brightness selected based on the known brightness of the at least one test sample;
    wherein the at least one test sample and the at least one compensation sample are selectable and presentable in combination such that an average exposure interpreted by the camera is substantially the same for each of the plurality of brightness measurements; and
    determining for one or more of the plurality of brightness measurements a captured brightness of the captured image.

2. The method of claim 1, wherein the at least one test sample having known brightness is presented to the camera on a display.

3. The method of claim 1, further comprising:
    generating a response curve for the camera based on the known brightness of the at least one test sample and the captured brightness of the captured image for at least one test sample for two or more of the brightness measurements.

4. The method of claim 1, wherein presenting at least one test sample having known brightness includes presenting the at least one test sample having one of a plurality of different known brightnesses of grayscale.

5. The method of claim 1, wherein presenting at least one test sample having known brightness includes presenting the at least one test sample having one of a plurality of different known brightnesses of a color.

6. The method of claim 1, wherein the at least one test sample and the at least one compensation sample are presented consecutively.

7. The method of claim 1, wherein the at least one test sample and the at least one compensation sample are presented simultaneously.

8. The method of claim 1, the method further comprising:
    determining for at least one of the plurality of brightness measurements the selected compensating brightness by presenting a reference sample to the camera, and
    alternately presenting to the camera the at least one test sample and at least one candidate compensation sample,
    wherein the at least one candidate compensation sample is a sample having a candidate brightness, observing a response of the average exposure interpreted by the camera, and substituting subsequent candidate samples having different candidate brightnesses and repeating the presenting and observing steps until the response of the average exposure interpreted by the camera satisfies a predetermined threshold of stability.

9. The method of claim 8,
wherein the camera applies automatic exposure adjustment in response to the average exposure; and
wherein determining the selected compensating brightness includes verifying that a measured brightness satisfies a predetermined threshold of stability during the automatic exposure adjustment.

10. The method of claim 9, the method further comprising determining a response time of the automatic exposure adjustment and wherein verifying that the measured brightness satisfies a predetermined threshold of stability comprises verifying that the measured brightness does not exceed the predetermined threshold of stability for a duration related to the determined response time.

11. A system to measure a brightness response of a camera, comprising:
a display;
one or more processors usable for obtaining a plurality of brightness measurements and configured to, for each brightness measurement, cause the system to
present to the camera, via the display, at least one test sample having known brightness and at least one compensation sample having compensating brightness selected based on the known brightness of the at least one test sample, and
capture, via the camera, an image of the at least one test sample; and
wherein the one or more processors are further configured to determine a captured brightness for one or more of the captured images; and
wherein the at least one test sample and the at least one compensation sample are selectable and presentable in combination such that an average exposure interpreted by the camera is substantially the same for each of the plurality of brightness measurements.

12. The system of claim 11, wherein the one or more processors is further configured to generate a response curve for the camera based on the known brightness of the at least one test sample and the captured brightness of the captured image of the at least one test sample for two or more of the brightness measurements.

13. The system of claim 12, further comprising an output device for outputting the generated response curve to a user.

14. The system of claim 11, wherein the one or more processors is configured to present the at least one test sample and the at least one compensation sample consecutively.

15. The system of claim 11, wherein the one or more processors is configured to present the at least one test sample and the at least one compensation sample consecutively simultaneously.

16. The system of claim 11, wherein the one or more processors is further configured to cause the system to
determine for at least one of the plurality of brightness measurements the selected compensating brightness by presenting a reference sample to the camera, and
alternately presenting to the camera the at least one test sample and at least one candidate compensation sample,
wherein the at least one candidate compensation sample is a sample having a candidate brightness, observing a response of the average exposure interpreted by the camera, and substituting subsequent candidate samples having different candidate brightnesses and repeating the presenting and observing steps until the response of the average exposure interpreted by the camera satisfies a predetermined threshold of stability.

17. A non-transitory machine readable medium having instructions thereon that when executed cause a system to:
obtain a plurality of brightness measurements, wherein each of the plurality of brightness measurements is obtained by causing the system to
present to the camera at least one test sample having known brightness,
capture via the camera an image of the at least one test sample, and
present to a camera at least one compensation sample having compensating brightness selected based on the known brightness of the at least one sample;
wherein the at least one test sample and the at least one compensation sample are selected and presented in combination such that an average exposure interpreted by the camera is substantially the same for each of the plurality of brightness measurements; and
determine for one or more of the plurality of brightness measurements a captured brightness of the captured image.

18. The non-transitory machine readable medium of claim 17, wherein the at least one test sample having known brightness is presented to the camera on a display.

19. The non-transitory machine readable medium of claim 17, further comprising instructions thereon that when executed cause a system to:
generate a response curve for the camera based on the known brightness of the at least one test sample and the captured brightness of the captured image for two or more of the plurality of brightness measurements.

20. The non-transitory machine readable medium of claim 17, wherein the at least one test sample and the at least one compensation sample are presented consecutively.

21. The non-transitory machine readable medium of claim 17, wherein the at least one test sample and the at least one compensation sample are presented simultaneously.

22. The non-transitory machine readable medium of claim 17, further comprising instructions thereon that when executed cause a system to:
determine for at least one of the plurality of brightness measurements the selected compensating brightness to be used by causing the system to
present a reference sample to the camera, and
alternately present to the camera the at least one test sample and the at least one compensation sample,
wherein the at least one compensation sample is a sample having a candidate brightness,
observe a response of the average exposure interpreted by the camera, and
substitute subsequent candidate samples having different candidate brightnesses and repeat the present and observe steps until the response of the average exposure interpreted by the camera satisfies a predetermined threshold of stability.

* * * * *